UNITED STATES PATENT OFFICE 2,500,016

EPOXYETHYLCYCLOHEXANE HYDROXY ETHERS

Owen Clement Wentworth Allenby, McMasterville, Quebec, Canada, assignor to Canadian Industries Limited, Montreal, Quebec, Canada, a corporation of Canada No Drawing. Application March 6, 1948, Serial No. 13,517. In Canada April 26, 1947

7 Claims. (Cl. 260—348)

This invention relates to organic compounds and more particularly to hydroxy ethers.

4-vinylcyclohexene dioxide, a compound having the structure

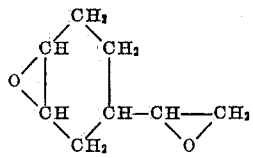

is prepared by reacting 4-vinylcyclohexene with hypochlorous acid whereby 4-vinylcyclohexene dichlorhydrins are obtained, and by dehydrohalogenating the dichlorhydrins to obtain the dioxide. This is set forth in greater detail in U. S. Serial No. 743,198, filed April 22, 1947, by Harris and myself which corresponds to Canadian application Serial No. 553,362.

This invention has as an object the preparation of new hydroxy ethers. Another object is the provision of a process thereto. Other objects will appear hereinafter.

These objects are accomplished by the following invention wherein 4-vinylcyclohexene dioxide is reacted with an alcohol and/or a phenol, i. e. an organic compound ROH wherein R is an organic radical selected from the group consisting of alkyl, alkenyl, hydroxyalkyl, alkoxyalkyl, aryl, substituted aryl, alicyclic and heterocyclic radicals.

The reaction may proceed in various ways as shown by the following equations:

(1)
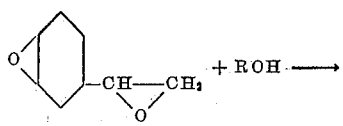

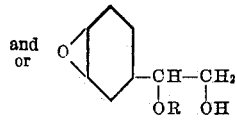

(2)
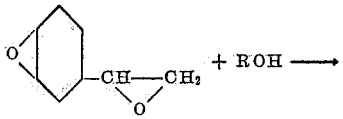

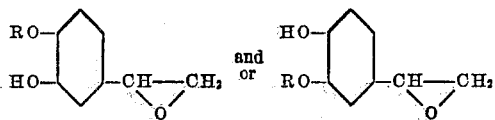

(3)
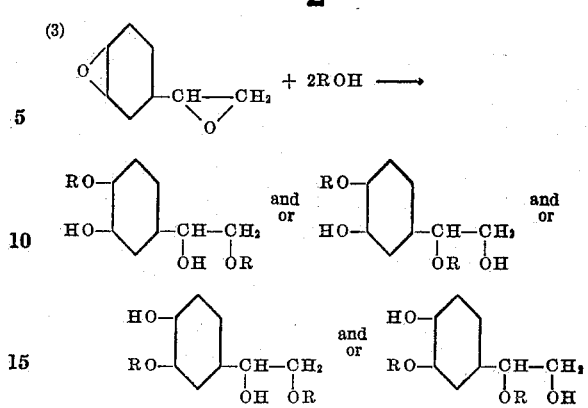

Isomers of mono and di hydroxy ethers may thus be obtained, the proportion of mono and di hydroxy ether being evaluated by determining the active hydrogen content of the reaction product. A convenient method for this purpose is the Zerewitinov method as adopted by Braude and Stern (Journal of the Chemical Society, page 404, 1946), which measures the volume of methane evolved from the reaction between the hydroxy ether and methyl magnesium iodide in solution in diethyl ether.

It has been found that the cyclohexene oxide ring is highly reactive with hydroxy compounds of the type above described while the vinyl oxide ring is comparatively resistant to attack. Mixtures of mono and di hydroxy ethers are thus obtained which contain a major proportion of mono hydroxy ethers.

The following examples are illustrative of the practice of this invention. There are of course many forms of the invention other than these specific ones.

Example I

Methanol (64 g., i. e., two mols) and 0.05 g. boron trifluoride as a 10% solution in acetic acid were placed in a three necked flask equipped with a stirrer, a condenser and a dropping funnel, and the mixture was heated to 70° C. over an oil bath. 28 g. (0.2 mol) 4-vinylcyclohexene dioxide were then added dropwise over a five minute period so as to maintain the temperature at 70° C., and the heating was continued for five minutes. The reaction mixture was thereafter cooled and 0.45 g. concentrated ammonium hydroxide added to destroy the catalyst. After unreacted methanol had been removed by heating under reduced pressure, a residue was obtained which was 87% distillable at 110–140° C. under a 0.03 mm. pressure, and which weighed 35.4 g. An active hydrogen determination made on the distillate indicated 100% of mono hydroxy ether, i. e., an 88% yield based on the weight of 4-vinylcyclohexene dioxide present in the reaction mixture. The product contained 0.108 mol of residual oxide per mol of porduct and gave a strong test with 2,4-dinitrophenylhydrazine, which is a specific reagent for aldehydes and ketones. The less reactive vinyl oxide ring had thus partially isomerized to a carbonyl group.

*Example II*

Methanol (64 g., i. e. two mols) was introduced into a three necked flask equipped with a stirrer, a condenser and a dropping funnel, and 0.05 g. boron trifluoride as a 10% solution in acetic acid was added thereto. The mixture was then heated to 70° C. and 28 g. (0.2 mol) 4-vinylcyclohexene dioxide were added dropwise over a ten minute period. Heating was afterwards continued for 1 hour at the same temperature, after which time the mixture was cooled and 0.45 g. concentrated ammonium hydroxide was added to destroy the catalyst. Unreacted methanol was then stripped off leaving 36 g. residue which was 84% distillable at 137° C. under a 0.2 mm. pressure. Mono and di hydroxy ethers were obtained in the distillate in 61% and 23% yields respectively, based on the weight of 4-vinylcyclohexene dioxide present in the reaction mixture. This distillate had no residual oxide linkages and reacted strongly with 2,4-dinitrophenylhydrazine, thus indicating total isomerization of the residual vinyl oxide ring to a carbonyl group.

*Example III*

To 64 g. (two mols) methanol placed in a three necked flask equipped with a stirrer, a thermometer and a dropping funnel, there was added 0.05 g. boron trifluoride as a 10% solution in acetic acid and the mixture was cooled to 3° C. 28 g. (0.2 mol) 4-vinylcyclohexene dioxide were then added dropwise over a 25-minute period, the temperature rising to 5° C. and remaining constant throughout the addition. After 15 minutes stirring at this temperature, 0.45 g. concentrated ammonium hydroxide was added to destroy the catalyst and unreacted methanol distilled off under reduced pressure. 32.6 g. residue was obtained which was 85% distillable at 110-130° C. under a 2 mm. pressure. The distillate was a mixture of 4-vinylcyclohexene dioxide and mono hydroxy ether, the latter being present in 58.5% yield, based on the weight of 4-vinylcyclohexene dioxide present in the reaction mixture.

*Example IV*

Methanol (221.2 g., i. e. seven mols), 0.05 g. boron trifluoride as a 10% solution in acetic acid, and 96.8 g. (0.7 mol) 4-vinylcyclohexene dioxide were mixed at ice temperature and then placed in a bomb. The bomb was thereafter heated for 5 hours during which time the mixture temperature ranged from 130° to 170° C. and the pressure from 150 to 200 lbs. The bomb was afterwards cooled and unreacted methanol evaporated off. A residue weighing 115.3 g. was thus obtained which was 82% distillable at 130-200° C. under a 0.1-0.2 mm. pressure. An active hydrogen determination made on the distillate indicated 51.8% and 23.5% yields of mono and di hydroxy ethers respectively, based on the weight of 4-vinylcyclohexene dioxide present in the reaction mixture.

*Example V*

Methanol (32 g., i. e. one mol) was reacted with 28 g. (0.2 mol) 4-vinylcyclohexene dioxide as in Example II. On distillation of unreacted methanol, a residue was obtained weighing 35.0 g. which was 60% distillable at 100-140° C. under a 0.05 mm. pressure. From an active hydrogen determination on the distillate, it was found that mono and di hydroxy ethers were obtained in 32.8% and 23.5% yields respectively, based on the weight of 4-vinylcyclohexene dioxide present in the reaction mixture.

*Example VI*

To 16 g. (0.5 mol) methanol in a three necked flask equipped with a stirrer, a condenser and a dropping funnel, was added 0.05 g. boron trifluoride and the mixture was heated to 70° C. 28 g. (0.2 mol) 4-vinylcyclohexene dioxide were then added dropwise over a ten minute period after which time 0.45 g. concentrated ammonium hydroxide was introduced to destroy the catalyst and the reaction mixture immediately cooled in an ice-bath. On removal of unreacted alcohol by distillation, 34.2 g. residue was obtained which was 59% distillable at 160-273° C. under a 0.19-0.9 mm. pressure. The distillate contained mono and di hydroxy ethers in 52.3% and 4.9% yields respectively, based on the weight of 4-vinylcyclohexene dioxide present in the reaction mixture.

*Example VII*

Methanol (16 g., i. e. 0.5 mol) was reacted with 28 g. (0.2 mol) 4-vinylcyclohexene dioxide as in Example II. The distillation of unreacted methanol left a residue weighing 34.5 g. which was 45% distillable at 100-140° C. under a 0.05 mm. pressure. Yields of 13.2% mono and 26.4% di hydroxy ethers based on the amount of dioxide used were found in the distillate.

*Example VIII*

Octyl alcohol (130 g., i. e., one mol) was reacted with 14 g. (0.1 mol) 4-vinylcyclohexene dioxide as in Example II. After the excess octyl alcohol had been removed, a residue weighing 14.1 g. was obtained which boiled at 150° C. under a 0.5 mm. pressure. An active hydrogen determination was made on this residue with the following results:

Sample weight_____ mg__ 52.5
Volume $CH_4$_____ cc__ 15.7

The theoretical values for one active hydrogen are 12.4 cc. $CH_4$, and for two active hydrogens, 16.5 cc. $CH_4$.

*Example IX*

After 60 g. (one mol) isopropyl alcohol had been reacted as in Example II with 14 g. (0.1 mol) 4-vinylcyclohexene dioxide, a viscous, water white oily residue was obtained which was 42% distillable at 110-130° C. under a 0.05 mm. pressure. This residue weighed 20.0 g. An active hydrogen determination made on the distillate gave the following results:

Sample weight_____ mg__ 50.9
Volume $CH_4$_____ cc__ 21.4

The theoretical values for one active hydrogen are 14.6 cc. $CH_4$, and for two active hydrogens, 22.6 cc. $CH_4$.

*Example X*

The procedure of Example II was applied to 58 g. (one mol) allyl alcohol and 14 g. (0.1 mol) 4-vinylcyclohexene dioxide. The excess alcohol was distilled and the residue, weighing 20.2 g. was 50% distillable at 120–160° C. under a 3 mm. pressure. The following were the results of an active hydrogen determination on the distillate:

Sample weight _____ mg__ 67.4
Volume CH4 _____ cc__ 25.2

The theoretical values for one active hydrogen are 19.6 cc. CH4, and for two active hydrogens, 30.4 cc. CH4.

Example XI 92.8 g. (two mols) "Butyl Carbitol" (diethylene glycol mono butyl ether) were placed in a three-necked flask equipped with a stirrer, a condenser and a dropping funnel. 0.05 g. boron trifluoride was added thereto as a 10% solution in acetic acid and the mixture heated to 80° C. 28 g. (0.2 mol) 4-vinylcyclohexene dioxide were then added dropwise and the heating continued at 90° C. for half an hour after which time unreacted carbitol was distilled off under reduced pressure. A 51.7 g. residue was obtained which was 88% distillable at 140–247° C. under a 1 mm. pressure. An active hydrogen determination made on the distillate gave the following results:

Sample weight _____ mg__ 89.5
Volume CH4 _____ cc__ 8.6

The theoretical values for one active hydrogen are 8.3 cc. CH4, and for two active hydrogens, 10.9 cc. CH4.

Example XII

To 98 g. (one mol) tetrahydrofurfuryl alcohol in a three necked flask equipped with a stirrer, a condenser and a dropping funnel there was added 0.05 g. boron trifluoride as a 10% solution in acetic acid and the mixture was heated to 75° C. on an oil bath. 14 g. (0.1 mol) 4-vinylcyclohexene dioxide were then added dropwise over a 10 minute period and the heating was continued at 75° C. for a further hour. The excess alcohol was afterwards stripped off, leaving a residue weighing 30.2 g. which was water soluble. The active hydrogen determination on this residue led to the results:

Sample weight _____ mg__ 91.8
Volume CH4 _____ cc__ 24.7

The thoretical values for one active hydrogen are 23.3 cc. CH4, and for two active hydrogens, 33.4 cc. CH4.

Boron trifluoride was also found to promote the reaction between 4-vinylcyclohexene dioxide and cyclohexanol, ethylene glycol, diethylene glycol and "Ethyl Carbitol" (diethylene glycol monoethyl ether). Two other acid catalysts, dihydroxyfluoroboric acid and perchloric acid, also proved to be effective as illustrated in the following examples.

Example XIII

Methanol (32 g., i. e., one mol) was reacted with 28 g. (0.2 mol) 4-vinylcyclohexene dioxide as in Example II in the presence of 0.05 g. dihydroxyfluoroboric acid as a 10% solution in acetic acid. A residue was obtained after the removal of unreacted alcohol, weighing 33.7 g. and being 75% distillable at 158° C. under a 0.8 mm. pressure. A yield of 60% mono and 11% di hydroxy ether was obtained in the distillate, based on the weight of 4-vinylcyclohexene dioxide present in the reaction mixture.

Example XIV

The procedure of Example II was applied to 32 g. (one mol) methanol and 28 g. (0.2 mol) 4-vinylcyclohexene dioxide in the presence of 0.05 g. perchloric acid as a 10% solution in acetic acid. After excess alcohol had been stripped off, a 35.2 g. residue was left which was 74% distillable at 160° C. under a 0.7 mm. pressure. Mono and di hydroxy ethers were obtained in the distillate in 60% and 13% yields respectively, based on the amount of dioxide used.

The reaction between 4-vinylcyclohexene dioxide and aromatic hydroxy compounds such as phenol and o-chlorophenol takes place without catalyst due to the acidity of the hydrogen atom in the hydroxyl group. This is illustrated in the next examples.

Example XV

To 188 g. (two mols) phenol heated to 150° C. was added, dropwise, 28 g. (0.2 mol) 4-vinylcyclohexene dioxide, after which addition the mixture was heated at 185° C. for one hour. Unreacted phenol was then distilled off under vacuum and 42 g. residue was left which was 90% distillable at 154–188° C. under a 1 mm. pressure. An active hydrogen determination made on the distillate gave the following results:

Sample weight _____ mg__ 88.8
Volume CH4 _____ cc__ 23.7

The theoretical values for one active hydrogen are 22.6 cc. CH4, and for two active hydrogens, 32.6 cc. CH4.

Example XVI

To 128.5 g. (one mol) o-chlorophenol heated to 150° C. was added, dropwise, 14 g. (0.1 mol) 4-vinylcyclohexene dioxide. After half an hour heating at 150° C. the excess phenol was distilled off under reduced pressure and 19.8 g. residue obtained which was 79% distillable at 156–172° C. under a 0.2 mm. pressure. The following are the results of an active hydrogen determination on the distillate:

Sample weight _____ mg__ 67.0
Volume CH4 _____ cc__ 17.4

The theoretical values for one active hydrogen are 15.5 cc. CH4, and for two active hydrogens, 21.0 cc. CH4.

As illustrated in the foregoing examples and particularly Examples I, II, VI and VII, the yield of di hydroxy ether increases with prolonged heating of the reaction mixture. However, at least in the case of methanol, even though the reaction is done under pressure at temperatures ranging from 150° to 170° C., the di hydroxy ether cannot be obtained in a yield greater than 26.5% based on the weight of 4-vinylcyclohexene dioxide present in the reaction mixture. This is apparently due to isomerization of the less reactive vinyl oxide ring to a carbonyl group, whether aldehydic or ketonic. It appears that 4-vinylcyclohexene dioxide is rapidly converted to the mono hydroxy ether and the latter is slowly converted to the di hydroxy ether while rapidly isomerizing in the vinyl oxide ring.

In addition to the production of mono and di hydroxy ethers by reaction of 4-vinylcyclohexene dioxide with organic hydroxy compounds, some polymerization of the dioxide and the carbonyl isomerization products also occurs. As an added side reaction, interaction of the dioxide with the hydroxy ether products would also be expected. These materials are high boiling and form part of the undistillable residue which is obtained after removal of the hydroxy ethers by distillation. An excess of the organic hydroxy compound is desirable in order to suppress these side reactions.

The process may be carried out at temperatures within the range 5° C. to 185° C. in an acid medium. The phenols are sufficiently acid that additional acid need not be employed. In the case of alcohols in acidic catalyst, preferably boron trifluoride is desirable.

Although boron trifluoride is the preferred catalyst in the foregoing examples, other acid catalysts are suitable for the operation of this invention. Suitable examples of such compounds are boric acid, dihydroxy fluoroboric acid, sodium perborate, perchloric acid, zinc chloride, stannic chloride and arsenious oxide.

The products of this invention are particularly useful for the preparation of numerous organic compounds. They also appear to be fairly good plasticizers.

As many apparently widely different embodiments of this invention may be made without departing from the spirit and scope thereof, it is to be understood that I do not limit myself to the specific embodiments thereof except as defined in the appended claims.

What is claimed is:
1. Compounds of the general formula

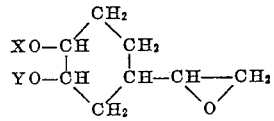

wherein X and Y are hydrogen and methyl, X being hydrogen when Y is methyl and X being methyl when Y is hydrogen.

2. 3 - epoxyethyl - 5 - hydroxy - 6 - methoxycyclohexane.

3. 3 - epoxyethyl - 5 - methoxy - 6 - hydroxycyclohexane.

4. A process for preparing compounds of the general formula

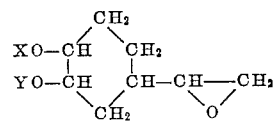

wherein X and Y are hydrogen and methyl, X being hydrogen when Y is methyl and X being methyl when Y is hydrogen, which comprises heating methanol with 4-vinylcyclohexene dioxide, in the proportion of about 10 mols of methanol per 1 mol of dioxide, at a temperature of about 70° C. for a period of from 5 to 15 minutes in the presence of a catalyst consisting of a metal halide.

5. A process for preparing compounds of the general formula

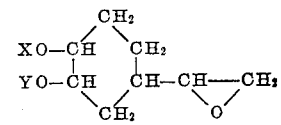

wherein X and Y are hydrogen and methyl, X being hydrogen when Y is methyl and X being methyl when Y is hydrogen, which comprises heating methanol with 4-vinylcyclohexene dioxide, in the proportion of about 10 mols of methanol per mol of dioxide, at a temperature of about 70° C. for a period of from 5 to 15 minutes in the presence of boron trifluoride as a catalyst.

6. A process for preparing compounds of the general formula

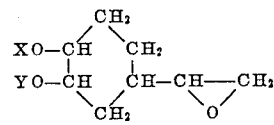

wherein X and Y are hydrogen and methyl, X being hydrogen when Y is methyl and X being methyl when Y is hydrogen, which comprises heating methanol with 4-vinylcyclohexene dioxide, in the proportion of about 10 mols of methanol per mol of dioxide, at a temperature of about 70° C. for a period of from 5 to 15 minutes in the presence of a catalyst consisting of a metal halide, cooling the reaction mixture, destroying the catalyst with a basic substance, removing unreacted methanol and recovering the reaction products by distillation under reduced pressure.

7. A process for preparing compounds of the general formula

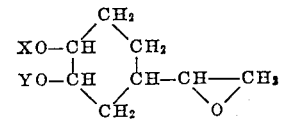

wherein X and Y are hydrogen and methyl, X being hydrogen when Y is methyl and X being methyl when Y is hydrogen, which comprises heating methanol with 4-vinylcyclohexene dioxide, in the proportion of about 10 mols of methanol per mol of dioxide, at a temperature of about 70° C. for a period of from 5 to 15 minutes in the presence of boron trifluoride as a catalyst, cooling the reaction mixture, destroying the catalyst with a basic substance, removing unreacted methanol and recovering the reaction products by distillation under reduced pressure.

OWEN CLEMENT WENTWORTH ALLENBY.

REFERENCES CITED

The following references are of record in the file of this patent:

UNITED STATES PATENTS

| Number | Name | Date |
| --- | --- | --- |
| 2,197,105 | Holt | Apr. 16, 1940 |
| 2,327,053 | Marple et al. | Aug. 17, 1943 |

OTHER REFERENCES

Lebedev et al.: Chem. Abstracts, vol. 8, p. 321.
Degering: "An Outline Of Organic Chem.," 4th edition, Barnes & Noble Inc., N. Y., p. 52.